// United State ] 4,163,216
Arpino ] Jul. 31, 1979

[54] SYSTEM FOR TRANSMITTING AIRPORT WEATHER INFORMATION

[76] Inventor: Roberto Arpino, 4722 Shire Ridge Rd. W., Columbus, Ohio 43220

[21] Appl. No.: 828,304

[22] Filed: Aug. 29, 1977

[51] Int. Cl.² .......................... G01C 21/00; H04Q 9/00
[52] U.S. Cl. .............................. 340/152 R; 73/178 T; 340/27 R; 340/27 NA; 340/207 R
[58] Field of Search .......... 340/147 R, 152 R, 207 R, 340/27 R, 27 SS, 27 NA, 27 AT; 73/178 T, 178 R

[56] References Cited

U.S. PATENT DOCUMENTS

| 3,281,789 | 10/1966 | Willcox et al. | 340/152 R |
| 3,373,405 | 3/1968 | Gadbois | 340/147 R |
| 3,949,399 | 4/1976 | Huber et al. | 340/27 NA |
| 4,043,194 | 8/1977 | Tanner | 340/27 NA |
| 4,079,905 | 3/1978 | Greene | 73/178 R |

Primary Examiner—Donald J. Yusko
Attorney, Agent, or Firm—Wilson, Fraser & Clemens

[57] ABSTRACT

A system for automatically providing real-time weather and other pertinent information about an airport to an aircraft. The system can operate continuously or the pilot can utilize his radio telephone equipment to activate the information transmitter. Instantaneous weather information such as temperature, wind speed and direction and barometric pressure are supplied to a microcomputer which determines the real-time values as an average over a predetermined time period. The microcomputer then responds to the activating signal from the aircraft or operates continuously to selectively address the stored messages corresponding to the real-time information for transmission to the aircraft.

16 Claims, 1 Drawing Figure

SYSTEM FOR TRANSMITTING AIRPORT WEATHER INFORMATION

BACKGROUND OF THE INVENTION

1. Field Of The Invention

This invention relates in general to airport weather information systems and in particular to a system for transmitting real-time weather information from a ground station to an airplane.

2. Description Of The Prior Art

One of the problems associated with either the landing at or the taking off from an airport which is not manned, is the lack of pertinent and up-to-date information on the conditions at the airport. Such information includes real-time weather information and other information which can be exclusive to particular airports.

When an aircraft approaches an airport for a landing, the pilot must know both the wind direction and the wind speed if he is to land safely. If the airport is uncontrolled, the pilot must first fly over the airport and observe the windsock to make a judgment as to the present wind direction. However, this is very wasteful as it often takes up to ten minutes of extra flying time to perform this maneuver. Also, this maneuver can be quite dangerous in the event of a low overcast.

In the landing of a jet aircraft, the present outside temperature should also be available to the pilot. A jet aircraft takes off and lands by its indicated air speed which is determined by the weight of the aircraft and the outside temperature. If the pilot is not informed of the present outside temperature, he must estimate this temperature in order to determine the indicated air speed of the aircraft. A miscalculation of the indicated air speed can result in a jet aircraft using a larger portion of the runway than is necessary. Thus, if the pilot of a jet aircraft is informed of the present outside temperature, he can determine the correct indicated air speed for landing and consequently use less runway and fuel.

One apparatus for providing an aircraft with weather information has been disclosed in U.S. Pat. No. 3,949,399 issued to Huber et al on Apr. 6, 1976 and entitled "Automatic Direction Finding Equipment For Airplanes." A weather transducer is connected to a recording system such that, when the pilot generates the appropriate control signal to the system, the weather information is transmitted to the pilot in speech form. However, this apparatus is not capable of analyzing the signals from the weather transducer to provide the pilot with information such as the variation in wind direction or the speed of the wind gusts.

SUMMARY OF THE INVENTION

The present invention concerns a system for providing real-time weather information in speech form to the pilot of an aircraft. The system can also provide the pilot with other information which can be considered pertinent to either landing or take off of the aircraft. The radio telephone equipment normally found on board the aircraft can be used to activate the information transmitter system.

The system includes a microcomputer which is used to read and analyze data received from a group of weather transducers. The microcomputer analyzes data received from a wind direction transducer over a last predetermined time interval to determine a most prominent wind direction and a most prominent wind variation. Data received from a wind speed transducer is analyzed in a similar manner to determine a most prominent wind speed and a most prominent wind gust. The wind information is then further classified into such categories as "calm" or "light and variable." Other weather information which is transmitted to the aircraft includes barometric pressure and temperature.

When the system transmitter is activated, the microcomputer individually addresses locations of a voice storage means to generate a message which is then transmitted to the aircraft.

It is an object of the present invention to facilitate the landing and take off of an aircraft at an uncontolled airport.

It is another object of the present invention to provide real-time weather information to the pilot of the aircraft.

It is a further object of the present invention to analyze and classify the real-time wind information to provide present wind condition information to the pilot of an aircraft.

DESCRIPTION OF THE PREFERRED EMBODIMENT

Figure 1:
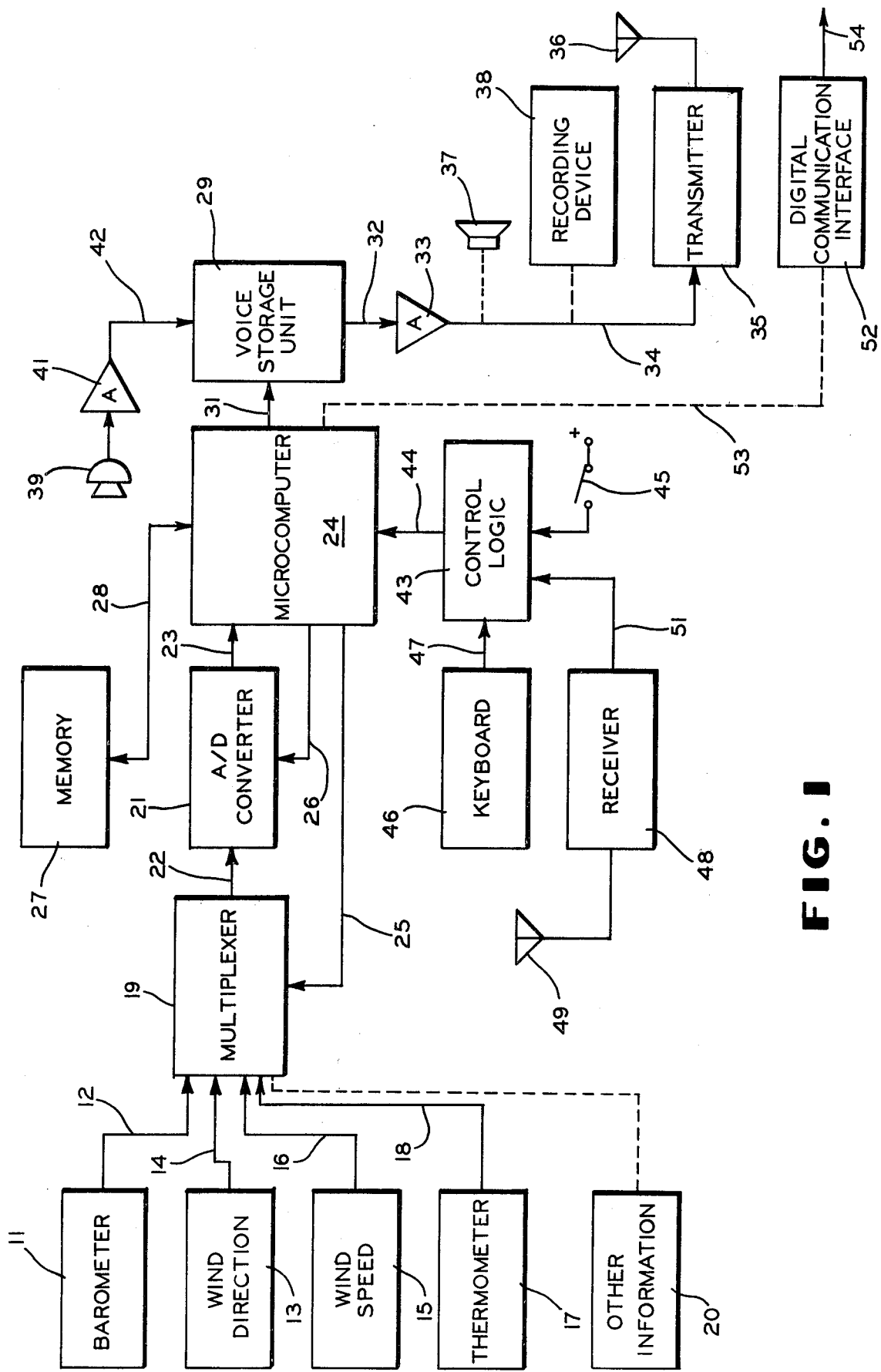
FIG. 1 is a block diagram of the aircraft information transmitting system according to the present invention.

Referring to FIG. 1, there is shown an airport information transmitting system according to the present invention which is designed to provide real-time information to a pilot of an aircraft. The system can provide the pilot with weather and other information which may be considered pertinent to either landing or take off. The system can be activated by the radio telephone equipment which is typically found on board most aircraft. When the system is activated, it transmits the information to the radio telephone which reproduces it in speech form.

The system includes a group of four transducers which are typically installed at most airports and which generate electrical signals corresponding to instantaneous weather information. A barometer transducer 11 generates a signal on a line 12 with a magnitude proportional to the instantaneous atmospheric pressure. A wind direction transducer 13 generates a signal on a line 14 with a magnitude proportional to the instantaneous direction of the wind. A wind speed transducer 15 generates a signal and a line 16 with a magnitude proportional to the instantaneous speed of the wind. A thermometer transducer 17 generates a signal on a line 18 with a magnitude proportional to the instantaneous outside temperature.

The four lines 12, 14, 16 and 18 are connected to a multiplexer 19. A block 20 is also connected to the multiplexer 19 by a dashed line. The block 20 is representative of other transducers which generate signals corresponding to other information such as dew point, ceiling height, rainfall, etc. The multiplexer 19 is used to control the transfer of the various weather information signals in serial multiplexed form to an analog to digital (A/D) converter 21 on an output line 22. The A/D converter 21 converts the analog signals received on the line 22 into digital form and generates the digitized signals on a line 23 connected to a microcomputer 24.

The microcomputer 24 controls the input of the data signals on the line 23 by generating the appropriate address and control signals on lines 25 and 26 connected to the multiplexer 19 and the A/D converter 21 respectively. For example, if the microcomputer 24 requires the barometer reading, it generates the appropriate barometer address and control signals on the line 25 to the multiplexer 19. The multiplexer 19 responds by selecting the signal on the line 12 to appear on the line 22 as an input to the A/D converter 21. The microcomputer 24 also generates a control signal on the line 26 to the A/D converter 21 which causes the converter to apply the digitized barometer signal to the line 23. The digitized barometer signal is then read by the microcomputer.

The microcomputer 24 includes a section of read-only-memory (ROM) which is utilized to store the instructions for the various programs. The microcomputer 24 is connected to a memory 27 by a bidirectional line 28 representing data transfer and address lines. The memory 27 includes a section of random-access-memory (RAM) which is used for the temporary storage of data during the execution of an instruction sequence. The line 28 is utilized to address and either write into or read from a location in the memory.

A voice storage unit (VSU) 29 receives address and control signals from the microcomputer 24 on a line 31. The VSU 29 comprises a plurality of storage locations each of which can be programmed to store digital data representing different words and phrases. When the microcomputer addresses a particular location in the VSU 29, the VSU transforms the digital information stored at that location into an analog signal which represents a particular portion of the desired speech message. This analog signal is generated on a line 32 as an input to an audio amplifier 33 which in turn generates an amplified signal on a line 34 to a transmitter 35. The transmitter 35 modulates a carrier signal with this amplified audio signal. The carrier signal frequency must be known by the pilot so that he can tune his radio telephone equipment to the frequency as he approaches the airport and activate the transmitter 35 as will be discussed. The modulated carrier signal is applied to a transmitting antenna 36. The output line 34 of the audio amplifier 33 can also be connected to a loud-speaker 37 or a recording device 38 as shown by a pair of dashed lines. The loudspeaker 37 can be utilized by a control tower operator to check the operation of the system and to confirm the information which is to be transmitted to the aircraft. The recording device 38 can be used to record for future reference all messages transmitted to the aircraft. For example, if an aircraft which has requested the real-time weather information is involved in an accident while landing, the recording device 38 would record the weather conditions, at the time of the accident. Thus, the recorded weather conditions could then later be checked to determine whether or not the accident might be attributed to poor weather conditions.

The VSU 29 is initially programmed by speaking into a microphone 39 which is connected to the input of an audio amplifier 41. The amplifier 41 amplifies the signal received by the microphone and generates the amplified signal on a line 42 as an input to the VSU 29. The microcomputer 24 generates a control signal on the line 31 to switch the VSU to the recording mode, such that the signal received by the VSU on the line 42 will be transformed into digital information. The microcomputer 24 also generates address signals on the line 31 to designate the location in which the digital information is to be stored. Although this system utilizes a voice storage unit which stores the individual speech text portions in digital form, any suitable recording device such as a magnetic disc can be used.

A control logic circuit 43 generates control signals to the microcomputer 24 on a line 44. When it is desired to program the speech information into the VSU 29, an interrupt signal can be generated by closing a switch 45 which is connected between the control logic circuit 43 and a positive power supply (not shown). The control logic circuit 43 generates the interrupt signal to the microcomputer 24 which responds by executing the instruction set which is utilized to program the VSU by generating the desired control and address signals on the line 31.

A keyboard 46 is connected to the circuit 43 by a line 47 and is utilized to generate signals representing the address signals to be generated by the microcomputer 24 to program the VSU. For example, if it is desired to store the word "one" at location one in the VSU, the operator selects location one via the keyboard 46 and then closes the switch 45. The microcomputer 24 then generates control and address signals on the line 31 to the VSU 29 indicating that location one is to be programmed. The operator speaks the word "one" into the microphone 39. The speech received by the microphone is amplified, converted into digital form, and stored in location one of the VSU 29. All other locations in the VSU can be programmed in a similar manner. It should be noted that the storage locations of the VSU can be individually preset to store speech text portions of various durations. For example, location one can be preset to store a speech text portion having a duration of one second while location two can be preset to store a speech text portion with a three second duration.

A receiver 48 is tuned to the same frequency as the transmitter 35 and is connected to an antenna 49 to receive activation signals transmitted by the aircraft radio telephone equipment. The receiver 48 generates control signals to the control logic circuit 43 on a line 51 in response to the activation signals received on the antenna 49. The control logic circuit 43 then generates an interrupt signal on the line 44 to the microcomputer 24 if it receives a predetermined number of signals on the line 51 within a predetermined time interval. This interrupt signal will direct the microcomputer to execute an instruction sequence which transmits the weather information to the aircraft. Thus, when an aircraft approaches an airport and the pilot desires to obtain the real-time weather information, the pilot can generate the appropriate number of signals to activate the transmitter 35 typically by depressing and releasing the transmit/receive switch of his radio telephone equipment. The control logic circuit 43 can be set to generate the interrupt signal if, for example, the pilot depresses and releases the transmit/receive switch at least five times within a period of three seconds. The system can also transmit the weather information on a continuous basis.

In addition to providing the pilot with the weather information in speech form, the microcomputer can be connected to a digital communication interface 52 by a line 53 to transmit digital information on a line 54 to a variety of devices such as a teletype and/or a digital transmitter. However, if the aircraft is to receive the transmitted digital information, it must be equipped with a suitable receiver and a set of digital readout indicators. Also, the microcomputer can be connected to activate a relay (not shown) such that, when an aircraft requests the weather information, the correct runway lights are turned on in accordance with the present wind direction.

The elements represented in FIG. 1 are commercially available. For example, the barometer transducer 11 can be a Model 250 barometer manufactured by Serta Systems, Inc. of Natick, Mass. The wind direction and speed transducers 13 and 15 can be a F-420C-2 wind speed and direction transmitter manufactured by Electric Speed Indicator Company of Cleveland, Ohio. The thermometer transducer 17 can be an LX5600AH temperature sensor manufactured by National Semiconductor of Santa Clara, Calif. The multiplexer 19 and the A/D converter 21 can be a DAS1128 data acquisition module manufactured by Analog Devices, Inc. of Norwood, Mass. The microcomputer 24 and the memory 27 can be a model TMS 990/100 M-1 computer card manufactured by Texas Instruments, Inc. of Houston, Tex. The voice storage unit 29 can be a VSU650 voice box manufactured by Comex Systems, Inc. of Hudson, N.H. The amplifier 41 can be a RC4136DB operational amplifier manufactured by Raytheon Company of Lexington, Mass. The amplifier 33 can be an LM380N audio amplifier manufactured by National Semiconductor. The keyboard 46 can be a standard teletype such as an LA36 DECwriter manufactured by the Digital Equipment Corporation of Maynard, Mass. The transmitter 35 and the receiver 48 can be a model KU-193 transceiver manufactured by King Radio Corporation of Olathe, Kan.

The control logic 43 can include a NAND flip flop having a set input connected to the output of the receiver 48 and a reset input connected to an output from the microcomputer 24. Each time the pilot depresses the microphone button, the carrier signal from the receiver is at a low level which sets the flip flop to generate an interrupt signal to the microcomputer. The microcomputer resets the flip flop and counts the number of such interrupt signals received during a predetermined period of time to determine whether or not to activate the transmitter. This circuit is not utilized when the transmitter is to operate continuously.

Having described the basic circuitry which is used to implement the present invention, the operation of the microprocessor-based system will now be discussed. There are three basic modes of operation of the system: the acquisition mode, the playback mode and the recording mode. The system is normally in the acquisition mode during which time the microcomputer is reading and analyzing data from the weather transducers. If the appropriate signals are received from an aircraft, the system will automatically switch to the playback mode wherein real-time weather information is transmitted to the aircraft. Having transmitted the information, the system will automatically return to the acquisition mode. The system enters the third mode of operation, the recording mode, when the switch 45 is manually actuated indicating that it is desired to program the voice storage unit. If the system is continuously transmitting, the acquisition and playback modes can be multiplexed.

During the acquisition mode, the microcomputer 24 generates the appropriate address and control signals on the lines 25 and 26 to sequentially read the data from the transducers 11, 13, 15 and 17. Data would also be read from the transducers represented by block 20. All of the data can be read, for example, every thirty seconds.

Each time data is read from any of the transducers, it is compared with the corresponding previously read values. The corresponding readings should not vary significantly between successive sampling periods. Thus, if one of these readings differs from the last corresponding reading by more than a predetermined amount, there has been a system malfunction and the microcomputer takes the appropriate action to indicate the malfunction such as transmitting a message that a malfunction has occurred and indicating the last reading before the malfunction. However, if the corresponding readings are within the predetermined limits, the system is functioning properly and the values are stored in the memory so that they may be outputted if the system switches to the playback mode.

The data which is obtained from the wind direction and the wind speed transducers are analyzed to provide the pilot with wind condition information. When data has been read from the wind direction transducer, the microcomputer executes an instruction set which determines the most prominent direction reading that has occurred during a predetermined time interval which can be, for example, the last five minutes. The microcomputer also determines the most prominent variation during this time interval. The most prominent direction reading can be either the reading that has been the most frequent or it can be the statistical average of all direction readings taken within the last predetermined time interval. The most prominent variation can be the reading other than the wind direction reading that has occurred most frequently. The most prominent direction and variation readings are then stored in the memory for future comparisons as will be discussed.

The readings obtained from the wind speed transducer are analyzed in a manner similar to the wind direction readings. After data has been read from the wind speed transducer 15, the microcomputer determines the most prominent speed reading and the most prominent gust reading that has occurred within the last predetermined time interval. The prominent speed and gust readings are calculated in a manner similar to the previously mentioned direction and variation reading respectively. The most prominent speed and gust reading are then stored in the memory.

The microcomputer then functions to classify the wind information. If the wind speed and wind variation are less than a pair of predetermined reference values, for example, five knots and ten degrees respectively, then the present wind condition is classified as "calm." However, if the wind speed is less than its predetermined value but the wind variation is greater than its predetermined values, the present wind condition is classified as "light and variable."

If the difference between the wind direction and the wind variation is less than a predetermined value, for example, ten degrees, then the microcomputer will not provide the aircraft with the information concerning the wind variation. Furthermore, if the difference between the wind speed and the wind gust is less than a predetermined value, for example, five knots, then the microcomputer will not provide the aircraft with the wind gust information. Thus, if the wind variation and gusts do not vary significantly from the wind direction and speed respectively, it is not necessary to provide the pilot of the aircraft with this information.

After reading the barometer and thermometer transducers and determining the present wind conditions, the microcomputer is ready to repeat the above sequence of operations. The microcomputer will continue to function in the acquisition mode until it is interrupted to switch to either the playback or the recording modes.

When it is desired to enter the recording mode to program the VSU 29, the switch 45 is closed to generate an interrupt signal to the microcomputer 24. The microcomputer will then begin to execute the proper instructions. As previously mentioned, the keyboard 46 enables the programmer to select the address location of the VSU at which a word or a group of words are to be stored. Typically, the VSU 29 can be programmed as follows:

| Address | Word |
|---------|------|
| 0 | zero |
| 1 | one |
| 2 | two |
| 3 | three |
| 4 | four |
| 5 | five |
| 6 | six |
| 7 | seven |
| 8 | eight |
| 9 | nine |
| 10–13 | (airport identification) |
| 14 | wind |
| 15 | altimeter |
| 16 | at |
| 17 | temperature |
| 18 | gust |
| 19 | light and variable |
| 20 | calm |
| 21 | barometer |
| 22 | (other information pertinent to either landing or take off.) |

The microcomputer enters into the playback mode when the pilot of the aircraft generates the appropriate number of signal pulses by depressing the transmit/receive switch of the radio telephone equipment. In the playback mode, the microcomputer individually addresses the locations in the VSU to generate the appropriate message. The message can include such information as the identification of the airport, weather and other pertinent information. The numerical portions of the message will be broadcast as single digits. Also, the units portions of the message such as feet, knots, degrees, etc. need not be broadcast as these are standard units in aircraft information systems. For example, an altimeter setting of 29.92 inches of mercury will be broadcast as follows: "altimeter" "two" "nine" "nine" "two."

In summary, the present invention concerns a system for transmitting real-time weather and other pertinent information for an airplane having radio telephone equipment wherein the airplane pilot generates a signal from the radio telephone equipment to activate the system or the system operates continuously. The system comprises a source of a signal representing instantaneous weather information and means responsive to the weather information signal over a predetermined time interval for determining a real-time weather information value, the determining means generating an address signal representing the real-time weather information value. The system further comprises means for storing a plurality of signals representing real-time weather information messages, the storage means being responsive to the address signal for generating the one of the plurality of message signals corresponding to the real-time weather information value and transmitting means responsive to the one message signal for transmitting the one message signal to the radio telephone equipment whereby the real-time weather information message is audibly reproduced for the pilot.

The signal source can be a weather transducer which generates the instantaneous weather information signal to a microcomputer as the means for determining an address signal representing the real-time weather information value. Typical signal sources include temperature, wind speed, wind direction and barometric pressure transducers.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope.

What is claimed is:

1. A system for transmitting realtime weather and other pertinent information to an airplane having a radio receiver comprising:

a source of a signal representing instantaneous weather information;

means responsive to said weather information signal over a predetermined time interval for determining a real-time weather information value and for generating an address signal representing said real-time weather information value;

means for storing a plurality of signals representing real-time weather information messages, said storage means being responsive to said address signal for generating the one of said plurality of message signals corresponding to said real-time weather information value; and transmitting means responsive to said one message signal for transmitting said one message signal to the radio receiver whereby said real-time weather information message is audibly reproduced for the pilot.

2. A system according to claim 1 wherein said determining means is responsive to a pilot generated activation signal and including receiving means responsive to the activation signal for generating a control signal and control logic means responsive to the control signal for generating an interrupt signal and wherein said determining means is responsive to the interrupt signal for generating said address signal.

3. A system according to claim 2 wherein said control logic means is responsive to a predetermined number of the control signals during a predetermined time period for generating said interrupt signal.

4. A system according to claim 1 wherein said signal source is a wind direction indicator for generating a signal representing the instantaneous wind direction and said determining means is responsive to the wind direction signal for determining the most prominent wind direction value and the value of the most prominent variation from the most prominent wind direction value over said predetermined time interval, said determining means generating a first address signal representing said most prominent wind direction value and a second address signal representing said most prominent wind variation value.

5. A system according to claim 4 wherein said storage means is responsive to the first address signal for generating the one of the plurality of message signals corresponding to said most prominent wind direction value and is responsive to the second address signal for generating the one of the plurality of message signals corresponding to said most prominent wind variation value.

6. A system according to claim 4 wherein said signal source includes a wind speed indicator for generating a signal representing the instantaneous wind speed and said determining means is responsive to the wind speed signal for determining the most prominent wind speed value and the most prominent wind gust value over said predetermined time interval, said determining means generating a third address signal representing said most prominent wind speed value and a fourth address signal representing said most prominent wind gust value.

7. A system according to claim 6 wherein said storage means is responsive to the third address signal for generating the one of the plurality of message signals corresponding to said most prominent wind speed value and is responsive to the fourth address signal for generating the one of the plurality of message signals corresponding to said most prominent wind gust value.

8. A system according to claim 1 wherein said determining means compares the real-time weather information value with the previously determined real-time weather information value, said determining means generating an address signal representing a system malfunction when said real-time weather information value differs from said previously determined weather information value by a predetermined amount.

9. A system according to claim 1 wherein said determining means is responsive to said weather information signal for determining the average value over said predetermined time interval and for generating an address signal representing said average weather information value.

10. A system according to claim 1 wherein said determining means is responsive to said weather information signal for determining the highest value over said predetermined time interval and for generating an address signal representing said highest weather information value.

11. A system for transmitting real-time weather and other information to an airplane having radio telephone equipment comprising:
  weather transducer means for generating a plurality of signals representing instantaneous weather information including a temperature signal, a wind speed signal, a wind direction signal and a barometric pressure signal;
  means sequentially responsive to said plurality of weather information signals over individual predetermined time intervals for determining a real-time weather information signals and for generating a plurality of address signals each representing one of said real-time weather information values;
  means for storing a plurality of signals representing real-time weather information messages, said storage means being responsive to said address signals for generating the one of the plurality of message signals corresponding to each one of said real-time weather information values; and
  transmitting means responsive to said message signals for transmitting said message signals to the radio telephone equipment whereby said real-time weather information signals are audibly reproduced to provide the pilot with temperature, wind speed and direction and barometric pressure information.

12. A system according to claim 9 wherein said plurality of address signals includes address signals representing the airport identification and wind conditions, said storage means stores signals representing an airport identification message and a wind condition message and is responsive to the airport identification address signal and the wind condition address signal for generating the airport identification message signal and the wind condition message signal respectively, and said transmitting means is responsive to the airport identification message signal and the wind condition message signal for transmitting said message signals to the radio telephone equipment of the aircraft.

13. A system according to claim 9 wherein said determining means compares each real-time weather information value with the previously determined corresponding real-time weather information value, said determining means generating an address signal representing a system malfunction when said real-time weather information value differs from said previously determined corresponding real-time weather information value by a predetermined amount, said storage means capable of storing signals representing a system malfunction message and responsive to the system malfunction signal for generating the system malfunction message signal, and said transmitting means responsive to the system malfunction message signal for transmitting the message signal to the radio telephone equipment of the aircraft.

14. A system according to claim 9 wherein said determining means is a microcomputer.

15. A system according to claim 11 wherein said determining means is responsive to said wind speed and wind direction signals for determining the average values over said individual predetermined time intervals and for generating address signals representing said average wind speed value and said average wind direction value.

16. A system according to claim 11 wherein said determining means is responsive to said wind speed signal for determining the highest value over said individual predetermined time interval and for generating an address signal representing said highest wind speed value.

* * * * *